(12) United States Patent
Ardiff et al.

(10) Patent No.: US 8,158,540 B2
(45) Date of Patent: Apr. 17, 2012

(54) ENVIRONMENTALLY RESISTANT BALLISTIC COMPOSITE BASED ON A NITRILE RUBBER BINDER

(75) Inventors: Henry G Ardiff, Chesterfield, VA (US); Ashok Bhatnagar, Richmond, VA (US); David A Hurst, Richmond, VA (US); Brian D Arvidson, Chester, VA (US); Lori L Wagner, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/966,825

(22) Filed: Dec. 13, 2010

(65) Prior Publication Data

US 2011/0143086 A1    Jun. 16, 2011

Related U.S. Application Data

(63) Continuation of application No. 11/962,533, filed on Dec. 21, 2007, now Pat. No. 7,858,540.

(51) Int. Cl.
*B32B 27/04* (2006.01)
*B32B 27/12* (2006.01)
*B32B 5/02* (2006.01)

(52) U.S. Cl. ............ 442/86; 442/88; 442/134; 442/135; 442/366; 442/399; 442/414; 428/911; 156/324; 156/338

(58) Field of Classification Search .................. 442/414, 442/366, 399, 86, 88, 134, 135; 428/911; 156/324, 338
See application file for complete search history.

(56) References Cited

U.S. PATENT DOCUMENTS

| | | | |
|---|---|---|---|
| 4,613,535 A | 9/1986 | Harpell et al. |
| 4,623,574 A | 11/1986 | Harpell et al. |
| 4,916,000 A | 4/1990 | Li et al. |
| 5,187,003 A | 2/1993 | Chitrangad |
| 5,229,199 A | 7/1993 | Miner et al. |
| 5,442,815 A | 8/1995 | Cordova et al. |
| 5,568,657 A | 10/1996 | Cordova et al. |
| 5,587,230 A | 12/1996 | Lin et al. |
| 5,783,625 A | 7/1998 | Mori et al. |
| 6,031,042 A | 2/2000 | Lipinski |
| 6,642,159 B1 | 11/2003 | Bhatnagar et al. |
| 6,828,385 B2 | 12/2004 | Gamlin et al. |
| 2003/0022583 A1 | 1/2003 | Thomas et al. |
| 2007/0117483 A1 | 5/2007 | Bhatnagar et al. |

*Primary Examiner* — Norca L Torres Velazquez
(74) *Attorney, Agent, or Firm* — Banner & Witcoff, Ltd.

(57) ABSTRACT

Ballistic resistant fabrics and articles that retain superior ballistic resistance performance after exposure to liquids such as sea water and organic solvents, such as gasoline and other petroleum-based products. The fabrics are formed from high performance fibers coated with a nitrile rubber binder polymer having an acrylonitrile content of from about 15 wt. % to about 50 wt. %, and are optionally coated with a binder that is a blend of a nitrile rubber and a fluorine-containing material.

20 Claims, No Drawings

ENVIRONMENTALLY RESISTANT BALLISTIC COMPOSITE BASED ON A NITRILE RUBBER BINDER

CROSS-REFERENCE TO RELATED APPLICATIONS

This application is a continuation of U.S. application Ser. No. 11/962,533 filed Dec. 21, 2007, now U.S. Pat. No. 7,858,540, the contents of which is hereby incorporated by reference in its entirety.

BACKGROUND OF THE INVENTION

1. Field of the Invention

This invention relates to ballistic resistant articles having excellent resistance to deterioration due to liquid exposure. More particularly, the invention pertains to ballistic resistant fabrics and articles that retain their superior ballistic resistance performance after exposure to liquids such as seawater and organic solvents, such as gasoline and other petroleum-based products.

2. Description of the Related Art

Ballistic resistant articles containing high strength fibers that have excellent properties against projectiles are well known. Articles such as bullet resistant vests, helmets, vehicle panels and structural members of military equipment are typically made from fabrics comprising high strength fibers. High strength fibers conventionally used include polyethylene fibers, aramid fibers such as poly(phenylenediamine terephthalamide), graphite fibers, nylon fibers, glass fibers and the like. For many applications, such as vests or parts of vests, the fibers may be used in a woven or knitted fabric. For other applications, the fibers may be encapsulated or embedded in a polymeric matrix material to form woven or non-woven rigid or flexible fabrics. Preferably each of the individual fibers forming the fabrics of the invention are substantially coated or encapsulated by the binder (matrix) material.

Various ballistic resistant constructions are known that are useful for the formation of hard or soft armor articles such as helmets, panels and vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene. These composites display varying degrees of resistance to penetration by high-speed impact from projectiles such as bullets, shells, shrapnel and the like.

For example, U.S. Pat. Nos. 4,623,574 and 4,748,064 disclose simple composite structures comprising high strength fibers embedded in an elastomeric matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material. U.S. Pat. Nos. 5,552,208 and 5,587,230 disclose an article and method for making an article comprising at least one network of high strength fibers and a matrix composition that includes a vinyl ester and diallyl phthalate. U.S. Pat. No. 6,642,159 discloses an impact resistant rigid composite having a plurality of fibrous layers which comprise a network of filaments disposed in a matrix, with elastomeric layers therebetween. The composite is bonded to a hard plate to increase protection against armor piercing projectiles.

Hard or rigid body armor provides good ballistic resistance, but can be very stiff and bulky. Accordingly, body armor garments, such as ballistic resistant vests, are preferably formed from flexible or soft armor materials. However, while such flexible or soft materials exhibit excellent ballistic resistance properties, they also generally exhibit poor resistance to liquids, including fresh water, seawater and organic solvents, such as petroleum, gasoline, gun lube and other solvents derived from petroleum. This is problematic because the ballistic resistance performance of such materials is generally known to deteriorate when exposed to or submerged in liquids. Further, while it has been known to apply a protective film to a fabric surface to enhance fabric durability and abrasion resistance, as well as water or chemical resistance, these films add weight to the fabric. Accordingly, it would be desirable in the art to provide soft, flexible ballistic resistant materials that perform at acceptable ballistic resistance standards after being contacted with or submerged in a variety of liquids, and also have superior durability without the use of a protective surface film in addition to a polymeric binder coating. The present invention provides a solution to this need.

Few conventional binder materials, commonly referred to in the art as polymeric "matrix" materials, are capable of providing all the desired properties discussed herein. Nitrile rubber polymers are desirable in other arts due to their resistance to dissolution, penetration and/or transpiration by sea water and resistance to dissolution, penetration and/or transpiration by one or more organic solvents, such as diesel gasoline, non-diesel gasoline, gun lube, petroleum and organic solvents derived from petroleum. It has been discovered that nitrile rubber or nitrile rubber-containing coatings advantageously contribute to the retention of the ballistic resistance properties of a ballistic resistant fabric after prolonged exposure to potentially harmful liquids, eliminating the need for a protective surface film to achieve such benefits, while maintaining good flexibility. Excellent ballistic and environmental properties have also been achieved when coating ballistic resistant fibrous materials with a composition comprising a blend of a nitrile rubber or nitrile rubber-containing polymer and a fluorine-containing polymer, which includes fluorine-containing oligomers and fluorine-containing resins.

SUMMARY OF THE INVENTION

The invention provides a non-woven ballistic resistant fabric comprising a plurality of fibers arranged in an array, said fibers being united and forming a fabric, said fibers having a tenacity of about 7 g/denier or more and a tensile modulus of about 150 g/denier or more; and said fibers having a polymeric binder material thereon which comprises a nitrile rubber polymer, said binder being resistant to dissolution, penetration and/or transpiration by water and resistant to dissolution, penetration and/or transpiration by one or more organic solvents, wherein the nitrite rubber polymer has an acrylonitrile content of from about 15 wt % to about 50 wt % and which polymeric binder material comprises from about 2% to about 50% by weight of the fabric.

The invention also provides a method of producing a ballistic resistant fabric, the method comprising either step I) or step II), wherein:

I) applying a polymeric binder material onto a plurality of fibers and thereafter forming a non-woven fabric from said fibers; said fibers having a tenacity of about 7 g/denier or more and a tensile modulus of about 150 g/denier or more; wherein said polymeric binder material comprises a nitrile rubber polymer, said binder being resistant to dissolution, penetration and/or transpiration by water and resistant to dissolution, penetration and/or transpiration by one or more organic solvents, wherein the nitrile rubber polymer has an acrylonitrile content of from about 15 wt % to about 50 wt % and which polymeric binder material comprises from about 2% to about 50% by weight of the fabric; or II) organizing a plurality of fibers into at least one fiber layer, thereafter combining the at least one fiber layer with a polymeric binder material to form a non-woven fabric; said fibers having a tenacity of about 7 g/denier or more and a tensile modulus of about 150 g/denier or more; wherein said polymeric binder material comprises a nitrile rubber polymer, said binder being resistant to dissolution, penetration and/or transpiration by water and resistant to dissolution, penetration and/or transpiration by one or more organic solvents, wherein the nitrile rubber polymer has an acrylonitrile content of from about 15 wt % to about 50 wt % and which polymeric binder material comprises from about 2% to about 50% by weight of the fabric.

The invention further provides a polymer composition comprising a blend of at least one a fluorine-containing material and at least one nitrile rubber terpolymer.

DETAILED DESCRIPTION OF THE INVENTION

The ballistic resistant materials and articles of the invention are characterized by retaining superior ballistic penetration resistance after exposure to water, particularly seawater, and organic solvents, particularly solvents derived from petroleum such as gasoline. Ballistic resistant fabrics and articles herein are formed from high strength fibers that are coated with a polymeric binder material which comprises a nitrile rubber polymer and is resistant to dissolution, penetration and/or transpiration by water, such as sea water, and resistant to dissolution, penetration and/or transpiration by one or more organic solvents, such as diesel gasoline, non-diesel gasoline, gun lube, petroleum and organic solvents derived from petroleum.

For the purposes of the invention, articles that have superior ballistic penetration resistance describe those which exhibit excellent properties against deformable projectiles and against penetration of fragments, such as shrapnel. The articles of the invention exhibit particularly high retention of ballistic performance against fragments, specifically 16-grain Right Circular Cylinder (RCC) fragments, after exposure to liquids. For the purposes of the present invention, a "fiber" is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

In the preferred embodiment of the invention, the ballistic resistant fabrics of the invention are non-woven fabrics which comprise a plurality of overlapping, non-woven fibrous plies that are consolidated into a single-layer, monolithic element. In this embodiment, each ply comprises an arrangement of non-overlapping fibers that are aligned in a unidirectional, substantially parallel array. This type of fiber arrangement is known in the art as a "unitape" (unidirectional tape) and is referred to herein as a "single ply". As used herein, an "array" describes an orderly arrangement of fibers or yarns, and a "parallel array" describes an orderly parallel arrangement of fibers or yarns. A fiber "layer" describes a planar arrangement of woven or non-woven fibers or yarns including one or more plies. As used herein, a "single-layer" structure refers to monolithic structure composed of one or more individual fiber plies that have been consolidated into a single unitary structure. By "consolidating" it is meant that the polymeric binder material, together with each fiber ply are combined into a single unitary layer. Consolidation can occur via drying, cooling, heating, pressure or a combination thereof. The term "composite" refers to consolidated combinations of fibers with the polymeric binder material.

A preferred non-woven fabric of the invention includes a plurality of stacked, overlapping plies (plurality of unitapes) wherein the parallel fibers of each single ply (unitape) are positioned orthogonally) (0°/90°) to the parallel fibers of each adjacent single ply relative to the longitudinal fiber direction of each single ply. The stack of overlapping non-woven fiber plies is consolidated under heat and pressure, or by adhering the polymeric resin composition coatings of individual fiber plies, to form a single-layer, monolithic element which has also been referred to in the art as a single-layer, consolidated network where a "consolidated network" describes a consolidated (merged) combination of fiber plies with a polymeric binder material. A polymeric binder material as used herein is also referred to in the art as a polymeric matrix composition. The terms "polymeric binder material" and "polymeric matrix composition" are used interchangeably herein, and describe a material that binds the fibers together by way of their adhesive characteristics or after being subjected to well known heat and/or pressure conditions.

As is conventionally known in the art, excellent ballistic resistance is achieved when individual fiber plies are cross-plied such that the fiber alignment direction of one ply is rotated at an angle with respect to the fiber alignment direction of another ply. Most preferably, the fiber plies are cross-plied orthogonally at 0° and 90° angles, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,573; and 4,737,402.

Most typically, non-woven fabrics include from 1 to about 6 plies, but may include as many as about 10 to about 20 plies as may be desired for various applications. The greater the number of plies translates into greater ballistic resistance, but also greater weight. Accordingly, the number of fiber plies forming a fabric or an article of the invention varies depending upon the ultimate use of the fabric or article. For example, in body armor vests for military applications, in order to form an article composite that achieves a desired 1.0 pound per square foot areal density (4.9 kg/m$^2$), a total of about 20 plies (or layers) to about 60 individual plies (or layers) may be required, wherein the plies/layers may be woven, knitted, felted or non-woven fabrics (with parallel oriented fibers or other arrangements) formed from the high-strength fibers described herein. In another embodiment, body armor vests for law enforcement use may have a number of plies/layers based on the National Institute of Justice (NIJ) Threat Level. For example, for an NIJ Threat Level IIIA vest, there may be a total of 22 plies/layers. For a lower NIJ Threat Level, fewer plies/layers may be employed.

Consolidated non-woven fabrics may be constructed using well-known methods, such as by the methods described in U.S. Pat. No. 6,642,159, the disclosure of which is incorporated herein by reference. Further, the fiber plies of the invention may alternately comprise yarns rather than fibers, where a "yarn" is a strand consisting of multiple filaments. Non-woven fiber plies may alternately comprise felted structures which are formed using conventionally known techniques, comprising fibers in random orientation instead of parallel arrays. Articles of the invention may also comprise combinations of woven fabrics, non-woven fabrics formed from unidirectional fiber plies and non-woven felt fabrics.

In another embodiment of the invention, the ballistic resistant fabrics of the invention comprise woven fabrics. Woven fabrics may be formed using techniques that are well known in the art using any fabric weave, such as plain weave, crowfoot weave, basket weave, satin weave, twill weave and the like. Plain weave is most common, where fibers are woven together in an orthogonal 0°/90° orientation. In another embodiment, a hybrid structure may be assembled where one both woven and non-woven fabrics are combined and interconnected, such as by consolidation. Prior to weaving, the individual fibers of each woven fabric material may or may not be coated with the polymeric binder material of the invention in a similar fashion as the non-woven fabrics.

The fibers forming the fabrics of the invention comprise high-strength, high tensile modulus fibers. As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each both as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fiber materials include polyolefin fibers, particularly extended chain polyolefin fibers, such as highly oriented, high molecular weight polyethylene fibers, particularly ultra-high molecular weight polyethylene fibers and ultra-high molecular weight polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, liquid crystal copolyester fibers. Each of these fiber types is conventionally known in the art.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A particularly preferred fiber type for use in the invention are polyethylene fibers sold under the trademark SPECTRA® from Honeywell International Inc. SPECTRA® fibers are well known in the art and are described, for example, in U.S. Pat. Nos. 4,623, 547 and 4,748,064.

Also particularly preferred are aramid (aromatic polyamide) or para-aramid fibers. Such are commercially available and are described, for example, in U.S. Pat. No. 3,671,542. For example, useful poly(p-phenylene terephthalamide) filaments are produced commercially by DuPont corporation under the trademark of KEVLAR®. Also useful in the practice of this invention are poly(m-phenylene isophthalamide) fibers produced commercially by DuPont under the trademark NOMEX®, fibers produced commercially by Teijin under the trademark TWARON®; aramid fibers produced commercially by Kolon Industries, Inc. of Korea under the trademark Heracron®; p-aramid fibers SVM™ and Rusar™ which are produced commercially by Kamensk Volokno JSC of Russia and Armos™ p-aramid fibers produced commercially by JSC Chim Volokno of Russia.

Suitable polybenzazole fibers for the practice of this invention are commercially available and are disclosed for example in U.S. Pat. Nos. 5,286,833, 5,296,185, 5,356,584, 5,534,205 and 6,040,050, each of which are incorporated herein by reference. Suitable liquid crystal copolyester fibers for the practice of this invention are commercially available and are disclosed, for example, in U.S. Pat. Nos. 3,975,487; 4,118, 372 and 4,161,470, each of which is incorporated herein by reference.

Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and widely commercially available.

The other suitable fiber types for use in the present invention include glass fibers, fibers formed from carbon, fibers formed from basalt or other minerals, rigid rod fibers such as M5® fibers, and combinations of all the above materials, all of which are commercially available. For example, the fibrous plies may be formed from a combination of SPECTRA® fibers and Kevlar® fibers. M5® fibers are rigid rod fibers comprising pyridobisimidazole-2,6-diyl (2,5-dihydroxy-p-phenylene) and are manufactured by Magellan Systems International of Richmond, Va. and are described, for example, in U.S. Pat. Nos. 5,674,969, 5,939,553, 5,945,537, and 6,040,478, each of which is incorporated herein by reference. Specifically preferred fibers include M5® fibers, polyethylene SPECTRA® fibers, aramid Kevlar® fibers and aramid TWARON® fibers. The fibers may be of any suitable denier, such as, for example, 50 to about 3000 denier, more preferably from about 200 to 3000 denier, most preferably from about 650 to about 1500 denier.

The most preferred fibers for the purposes of the invention are either high-strength, high tensile modulus extended chain polyethylene fibers or high-strength, high tensile modulus para-aramid fibers. As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiment of the invention, the tenacity of the fibers should be about 15 g/denier or more, preferably about 20 g/denier or more, more preferably about 25 g/denier or more and most preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and most preferably about 1,500 g/denier or more. The fibers of the invention also have a preferred energy-to-break of about 15 J/g or more, more preferably about 25 J/g or more, more preferably about 30 J/g or more and most preferably have an energy-to-break of about 40 J/g or more.

These combined high strength properties are obtainable by employing well-known processes. U.S. Pat. Nos. 4,413,110, 4,440,711, 4,535,027, 4,457,985, 4,623,547 4,650,710 and 4,748,064 generally discuss the formation of preferred high strength, extended chain polyethylene fibers employed in the present invention. Such methods, including solution grown or gel fiber processes, are well known in the art. Methods of forming each of the other preferred fiber types, including para-aramid fibers, are also conventionally known in the art, and the fibers are commercially available.

In accordance with the invention, each of the fibers present in the woven or non-woven fabrics of the invention have one or more surfaces, and the surfaces of the fibers are at least partially coated with a polymeric binder material that is resistant to dissolution, penetration and/or transpiration by water, and resistant to dissolution by one or more organic solvents. Generally, a coating of a polymeric binder material is necessary to efficiently merge, i.e. consolidate, a plurality of fiber plies. Most preferably, the outer surface of each fiber is substantially coated with said water and organic solvent resistant polymeric binder material such that preferably 100% of the surface area of each individual fiber is covered by said polymeric binder material. Where the fabrics comprise a plurality of yarns, each fiber forming a single strand of yarn is preferably coated with the polymeric binder material.

As stated above, the fibers comprising the ballistic resistant fabrics are coated with a polymeric binder material, which is also commonly referred to in the art as a polymeric matrix material. The polymeric binder material includes one or more components and facilitates the consolidation, or merging together, of the fibers and fiber plies (i.e. multiple unitapes). The surfaces of each of the fibers forming said fibrous layers are at least partially coated with a polymeric matrix material, and each of the fibers forming the fabrics of the invention are preferably substantially coated by the binder material.

The fibers of the invention are coated with a binder material that comprises a nitrile rubber polymer, preferably an uncured (non-crosslinked) nitrile rubber. Cured or crosslinked nitrile rubbers have a higher modulus than uncured nitrile rubbers and, accordingly, are stiffer than uncured materials, which is a concern in some soft body armor applications. Nitrile rubber polymers are particularly desirable because they achieve the desired resistance to water, e.g. salt water, and organic solvents such as gasoline, while imparting good peel strength and flexibility to the fabrics, both of which are indications of excellent durability. Nitrile rubber polymers are a family of unsaturated copolymers of acrylonitrile and butadiene and many different types are available having different properties. For example, the desired resistance to organic solvents such as oil and gasoline may be controlled and balanced with other properties, such as resistance to extreme temperatures, by regulating the acrylonitrile content of the nitrile rubber versus the butadiene content. Due to its polarity, a nitrile rubber having a higher acrylonitrile content has better resistance to oils and gasoline than nitrile rubbers with lower acrylonitrile content, and also increases tensile strength. Nitrile rubbers having a lower acrylonitrile content also exhibit good resistance to oils and gasoline, though not as good as high acrylonitrile content polymers, but exhibit excellent flexibility and resilience, while high acrylonitrile content polymers exhibit higher stiffness and lower flexibility. For the present invention, it is important to strike a balance between the acrylonitrile and butadiene depending on the type of ballistic resistant fabric desired.

In general, the nitrile rubber binder (or the nitrile rubber component of the binder) has an acrylonitrile content of from about 15 wt. % to about 50 wt. %. For soft armor applications, the nitrile rubber preferably has an acrylonitrile content of from about 15 wt. % to about 30 wt. %, more preferably from about 20 wt. % to about 30 wt. %. For the formation of flexible, soft armor articles, the nitrile rubber preferably has a low tensile modulus, particularly an initial tensile modulus measured at about 6,000 psi (41.4 MPa) or less at 37° C. according to ASTM D638 testing procedures. Preferably, the initial tensile modulus of the nitrile rubber for flexible, soft armor is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the nitrile rubber is preferably less than about 0° C., more preferably the less than about −40° C., and most preferably less than about −50° C. The nitrile rubber also has a preferred elongation to break of at least about 50%, more preferably at least about 100% and most preferably has an elongation to break of at least about 300%.

For hard armor applications, the nitrile rubber preferably has a preferred acrylonitrile content of from about 31 wt. % to about 50 wt. %, more preferably from about 40 wt. % to about 50 wt. %. Nitrile rubber binders with a high acrylonitrile content generally have a higher tensile modulus than low acrylonitrile materials and accordingly are particularly well suited for rigid armor applications. Also, crosslinked nitrile rubbers have a higher tensile modulus than non-crosslinked rubbers. There arc at least three distinct crosslinking mechanisms specifically for nitrile rubber, one more appropriate for hard armor (ZnO) and two for soft armor (sulfur and peroxide). These distinct mechanisms may also be combined or manipulated if desired. Lower modulus nitrile rubber-based composites are suited for a wider range of uses, while the higher modulus materials are more appropriate for the production of rigid and hard armor applications. As used herein throughout, the term tensile modulus means the modulus of elasticity as measured by ASTM 2256 for a fiber and by ASTM D638 for a polymeric composition material.

In preferred embodiments of the invention, the nitrile rubber polymers comprise nitrile rubber terpolymers comprising an acrylonitrile monomer, a butadiene monomer and another monomer component, such as N-methylol acrylamide or a carboxylic acid, such as methacrylic acid. Preferably the nitrile rubber comprises a carboxylated nitrile rubber (XNBR) terpolymer. A preferred XNBR terpolymer preferably comprises from about 0.1 weight % to about 20 weight % of the carboxylic acid monomer, more preferably from about 1 wt. % to about 10 wt. % and most preferably from about 1 wt. % to about 5 wt. % of the carboxylic acid monomer. These amounts are not intended to be limiting. Binder materials comprising carboxylated nitrile rubber are preferred because they produce fabrics having outstanding abrasion resistance and excellent strength. Such terpolymers are well known in the art and are commercially available, for example, from Dow Reichhold Specialty Latex, LLC. of Research Triangle Park, N.C., under the trademark TYLAC® 68073. Useful carboxylated nitrile rubber terpolymers are also described, for example, in U.S. Pat. Nos. 6,127,469, 6,548,604 and 7,030,193, the disclosures of which are incorporated herein by reference. Another preferred terpolymer comprises an acrylonitrile monomer, a butadiene monomer and N-methylol acrylamide (NMA). One example of this type of terpolymer is HYCAR® 1572X64, commercially available from Emerald Performance Materials of Akron, Ohio.

Other useful terpolymers of this type are described, for example, in U.S. Pat. No. 5,783,625 and Canadian patent CA1190343, the disclosures of which are incorporated herein by reference. A preferred acrylonitrile/butadiene/NMA terpolymer preferably comprises from about 0.3 weight % to about 10 weight % of the NMA monomer, more preferably from about 1 wt. % to about 10 wt. % and most preferably from about 2 wt. % to about 4 wt. % of the NMA monomer. U.S. Pat. No. 5,783,625 describes a useful range of self-crosslinking NMA monomer of between 0.3% and 10%. Canadian patent CA1190343 provides rubber compositions including (A) 10-90% by weight of a terpolymer consisting of a conjugated diolefin, an α,β-unsaturated nitrile and an α,β-unsaturated carboxylic ester, (B) 10-90% by weight of a sulfur-vulcanizable acrylic rubber and (C) 0-40% by weight of a copolymer consisting of a conjugated diolefin and an α,β-unsaturated nitrile having a combined α,β-unsaturated nitrile content of 10-60% by weight. This rubber composition has excellent processability, oil resistance and heat resistance.

Optionally, the nitrile rubbers of the invention may be hydrogenated to improve durability and environmental resistance. Particularly, hydrogenated nitrile rubbers (HNBR) have excellent mechanical, thermo-oxidative and chemical resistant properties and an excellent operating temperature range. Hydrogenated nitrile rubbers are well known in the art.

In another embodiment of the invention, the polymeric binder material may comprise a blend of a nitrite rubber and a fluoropolymer and/or a fluorocarbon resin. It has been found that a polymeric binder material comprising a blend of a nitrile rubber component and one or more fluorine-containing components have a significantly improved $V_{50}$ retention % after immersion in either salt water or gasoline, i.e. greater than or equal to 95% retention as illustrated in the inventive examples, compared to fabrics formed with neither nitrile rubber nor a fluorine-containing material. As used herein, a "fluorine-containing" material includes fluoropolymers and fluorocarbon-containing materials (i.e. fluorocarbon resins). A "fluorocarbon resin" generally refers to polymers including fluorocarbon groups. When such blends are formed, no reaction takes place between the nitrile rubber polymer and the fluoropolymer/fluorocarbon resin. A copolymer is not formed, only a physical blend. It has also been recognized that the fluoropolymer/fluorocarbon resin, which will normally have a lower molecular weight than the nitrile rubber, tends to concentrate and organize itself at the boundaries, such as at the outer fabric surfaces (i.e. the air-to-binder interface, i.e. the outside surface, and the fiber-to-binder interface, i.e. the inside surface). This distribution of the fluorocarbon resin at the surfaces increases the effectiveness of the fluorocarbon resin in regards to its enhancing the environmental resistance (salt water, gasoline, etc.) of the composite. In this embodiment, the type of nitrite rubber is not limited and may comprise, for example, XNBR, HNBR or non-hydrogenated nitrile rubber.

Fluorine-containing materials, particularly fluoropolymers and fluorocarbon resin materials, are commonly known for their excellent chemical resistance and moisture barrier properties. Useful fluoropolymer and fluorocarbon resin materials herein include fluoropolymer homopolymers, fluoropolymer copolymers or blends thereof as are well known in the art and are described in, for example, U.S. Pat. Nos. 4,510,301, 4,544,721 and 5,139,878. Examples of useful fluoropolymers include, but are not limited to, homopolymers and copolymers of chlorotrifluoroethylene, ethylene-chlorotrifluoroethylene copolymer, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof.

Preferred fluoropolymers include homopolymers and copolymers of polychlorotrifluoroethylene. Particularly preferred are PCTFE (polychlorotrifluoroethylene homopolymer) materials sold under the ACLON™ trademark and which are commercially available from Honeywell International Inc. of Morristown, N.J. The most preferred fluoropolymers or fluorocarbon resins include fluorocarbon-modified polymers, particularly fluoro-oligomers and fluoropolymers formed by grafting, condensing or reacting fluorocarbon side-chains onto or copolymerizing fluorocarbon side chain-containing monomers (such as perfluorooctanoic acrylate) into conventional polyethers (i.e. fluorocarbon-modified polyethers), polyesters (i.e. fluorocarbon-modified polyesters), polyanions (i.e. fluorocarbon-modified polyanions) such as polyacrylic acid (i.e. fluorocarbon-modified polyacrylic acid) or polyacrylates (i.e. fluorocarbon-modified polyacrylates), and polyurethanes (i.e. fluorocarbon-modified polyurethanes). One particularly preferred fluorocarbon resin is NUVA® TTHU, a perfluoroalkyl acrylic copolymerizate commercially available from Clariant International, Ltd. of Switzerland. These fluorocarbon side chains or perfluoro compounds are generally produced by a telomerization process and are referred to as $C_8$ fluorocarbons. For example, a fluoropolymer or fluorocarbon resin may be derived from the telomerization of an unsaturated fluorocompound, forming a fluorotelomer, where said fluorotelomer is further modified to allow reaction with a polyether, polyester, polyanion, polyacrylic acid, polyacrylate or polyurethane, and where the fluorotelomer is then grafted onto a polyether, polyester, polyanion, polyacrylic acid, polyacrylate or polyurethane. Fluorocarbon resins may also be produced, for example, by the copolymerization of a fluorocarbon side chain-containing monomer with a conventional monomers, such as an oligomer formed by the copolymerization of butyl acrylate or ethyl acrylate and perfluorooctanoic acrylate. Good representative examples of these fluorocarbon-containing polymers are NUVA® fluoropolymer products, commercially available from Clariant International, Ltd. of Switzerland. Other fluorocarbon resins, fluoro-oligomers and fluoropolymers having perfluoro acid-based, perfluoro acrylate-based and perfluoro alcohol-based side chains are also most preferred. Fluoropolymers and fluorocarbon resins having fluorocarbon side chains of shorter lengths, such as $C_6$, $C_4$ or $C_2$, are also suitable, such as POLYFOX™ fluorochemicals, commercially available from Omnova Solutions, Inc. of Fairlawn, Ohio. Generally, but not necessarily the fluorocarbon-containing component and nitrile rubber component are both wet (i.e. in the molten or liquid state, dispersed or dissolved) when they are blended to facilitate their miscibility and blendability, and are applied to the fibers as a wet blend.

While fluoropolymers and fluorocarbon resins increase the environmental barrier properties, they tend to lack optimal processability and flexibility properties, as well as other physical properties generally considered useful in ballistic resistant composites. These important properties are provided by the nitrile rubber component, and together they produce a superior binder material.

In a blend, the proportion of the nitrile rubber component to the fluorine-containing component should be set to allow the physical properties of the blended matrix composition to be dominated by the physical properties of the nitrile rubber component. At a minimum, the nitrite rubber component should be in excess of the fluorine-containing component(s). The physical properties of the fluorine-containing component(s) are of secondary importance. The fluorine-containing component or components will be chosen due to their ability to repel water and gasoline, as well as their ability to be compounded into a stable or useful blended emulsion/dispersion with the nitrile rubber component.

In the preferred embodiments of the invention, the fluorine-containing component comprises from about 1% by weight to about 50% by weight of the nitrile rubber containing polymeric binder material. More preferably, the fluorine-containing component comprises from about 3% to about 35% by weight of the nitrile rubber-containing polymeric binder material, more preferably from about 5% to about 25% by weight, and more preferably from about 5% to about 20% by weight of the nitrile rubber-containing polymeric binder material. The nitrile rubber dispersions used to produce the polymer composition preferably have a solids content of from about 30% to about 50%, although values outside this range are possible. The fluorocarbon resin dispersions used to produce the polymer composition preferably have a solids content of from about 8% to about 30%, but values outside this range are also possible. A dry binder including a fluoropolymer/fluorocarbon resin most preferably includes a fluoropolymer/fluorocarbon resin solids content of from about 8% to about 12%, solids-on-solids. For example, a blend including 85 wt. % of a nitrile rubber dispersion (at 40% solids) and 15 wt. % of a fluorocarbon resin dispersion (at 25% solids), would include 9.93% of dry fluorocarbon resin if dried to form a dry blend.

It has been found that a new polymer composition which comprises a blend of at least one fluorine-containing material and at least one nitrile rubber terpolymer is particularly useful herein. When such blends are formed no reaction takes place between the nitrile rubber polymer and the fluoropolymer/fluorocarbon resin and a copolymer is not formed. It is only a physical blend. The nitrile rubber terpolymer is a copolymer made from three different monomers: an acrylonitrile monomer component, a diene monomer component and a third monomer component. The diene monomer component preferably comprises butadiene. The third monomer component is preferably a self-crosslinking monomer and preferably comprises a carboxylic acid or an ester of an unsaturated carboxylic acid. Useful self-crosslinking monomers are disclosed, for example, in U.S. Pat. No. 5,783,625, the disclosure of which is incorporated herein by reference. More particularly, useful examples for the third monomer component non-exclusively include N-methylolacrylamide, N-methylolmethacrylamide, N,N'-dimethylolacrylamide, N,N'-dimethylolmethacrylamide, acrylamide, methacrylamide, N-methoxymethylacrylamide, N-methoxymethylmethacrylamide, N-ethoxymethylacrylamide N-ethoxymethylmethacrylamide, N-butoxymethylacrylamide, N-butoxymethylmethacrylamide and N,N'-methylene-bisacrylamide, N-(anilinophenyl)acrylamide, N-(anilinophenyl)methacrylamide, N-(anilinophenyl)cinnamamide, N-(anilinophenyl)crotonamide, N-(anilinophenyl)amino-2-hydroxypropyl allyl ether, N-(anilinophenyl)amino-2-hydroxypropyl methallyl ether, 5-N-(4-anilinophenyl)amino-2-hydroxypentyl acrylate and 5-N-(4-anilinophenyl)amino-2-hydroxypentyl methacrylate. Also useful are methyl acrylate, methyl methacrylate, ethyl acrylate, ethyl methacrylate, butyl acrylate, butyl methacrylate, 2-ethylhexyl acrylate, 2-ethylhexyl methacrylate, trifluoroethyl acrylate, trifluoroethyl methacrylate, tetrafluoropropyl acrylate, tetrafluoropropyl methacrylate, ethyl itaconate, butyl fumarate, butyl maleate, methoxymethyl acrylate, methoxymethyl methacrylate, ethoxyethyl acrylate, ethoxyethyl methacrylate, methoxyethoxyethyl acrylate and methoxyethoxyethyl methacrylate; cyanoalkyl esters of acrylic acid and methacrylic acid such as cyanomethyl acrylate, cyanomethyl methacrylate, 2-cyanoethyl acrylate, 2-cyanoethyl methacrylate, 1-cyanopropyl acrylate, 1-cyanopropyl methacrylate, 2-ethyl-6-cyanohexyl acrylate, 2-ethyl-6-cyanohexyl methacrylate, 3-cyanopropyl acrylate and 3-cyanopropyl methacrylate; fluoroalkyl vinyl ethers such as fluoroethyl vinyl ether; and vinylpyridine.

The nitrile rubber terpolymer component of this unique nitrile rubber/fluoropolymer (fluorocarbon) polymer composition preferably includes an acrylonitrile content of from about 15 wt. % to about 50 wt. %, more preferably from about 15 wt. % to about 40 wt. % and most preferably from about 15 wt. % to about 30 wt. %. The nitrile rubber terpolymer component of this new polymer preferably includes a butadiene content of from about 40 wt. % to about 84.9 wt. %, more preferably from about 55 wt. % to about 84.5 wt. % and most preferably from about 66 wt. % to about 83 wt. %. The nitrile rubber terpolymer component of this new polymer preferably includes from about 0.1 wt. % to about 10 wt. %, more preferably from about 0.5 wt. % to about 5 wt. % and most preferably from about 2 wt. % to about 4 wt. % of said third monomer component.

Most preferably the nitrile rubber terpolymer comprises a terpolymer formed from an acrylonitrile monomer component, a butadiene monomer component and either N-methylol acrylamide or a carboxylic acid monomer component. A most preferred nitrile rubber terpolymer comprises carboxylated nitrite rubber. The nitrile rubber terpolymer component of this new polymer preferably comprises from about 60 wt. % to about 99 wt. % of said polymer composition, more preferably from about 75 wt. % to about 97 wt. % and most preferably from about 85 wt. % to about 95 wt. %. Accordingly, the fluorine-containing component of this new polymer preferably comprises from about 1 wt. % to about 40 wt. % of said polymer composition, more preferably from about 3 wt. % to about 25 wt. % and most preferably from about 5 wt. % to about 15 wt. %, solids-on-solids. Useful fluorine-containing materials are described above.

The polymeric binder materials preferably further comprise at least one surfactant. It has been unexpectedly found that the addition of a surfactant to a binder of the invention achieves improved uniformity of the binder coating on the individual fibers. It has also been found that the addition of a surfactant increases the stability of a blended dispersion and promotes the uniformity of the distribution of a fluorocarbon resin, if present, at the air-to-binder and fiber-to-binder interfaces of a nitrile rubber/fluorocarbon resin blend. The surfactant may be included whether the fluoropolymer is present or not. Suitable surfactants non-exclusively include anionic, cationic, amphoteric and non-ionic surfactants. Generally, non-ionic surfactants are preferred because they have the most limited solubility in water and do not form salts with anionic surfactants. Further, the polymeric binder materials are very sensitive to anionic and cationic surfactants because the high charge density may lead to coagulation of the dispersions. Non-ionic surfactants typically do not interfere with the nature of the dispersed polymers (micelles containing solids), or exhibit minimal interference. Preferred non-ionic surfactants include non-ionic surfactants based on fatty acids and fatty alcohols, particularly those having hydrophile-lipophile balance (HLB) values of 7 to 10. A particularly preferred surfactant is a non-ionic polyethylene-glycol-trimethyl-nonyl-ether, such as TERGITOL® TMN-3 surfactant commercially available from Dow Chemical Company of Midland, Mich. TERGITOL® TMN-3 is preferred because it provides a low surface tension at a low concentration. Low surface tension is desired to make sure the dispersion spreads well and covers each individual fiber. TERGITOL® TMN-3 has an HLB value of approximately 8 and exhibits carbon chain branching that helps reducing surface tension. Also useful are non-ionic fluorosurfactants, such as Fluowet® fluorosurfactants from Clariant GmbH Corporation of Germany, particularly Fluowet® OTN. However, fluorosurfactants may not be acceptable due to environmental concerns. Also useful are silicone surfactants in combination with ethoxylated castor oils that are partially end-capped with oleic acid.

In the preferred embodiment of the invention, a surfactant is present and comprises from about 0.01% to about 10% by weight of the polymeric binder material, more preferably from about 0.05% to about 5% by weight, and most preferably from about 0.1% to about 2.5% by weight of the polymeric binder material. The polymeric composition may also include fillers such as carbon black or silica, may be extended with oils, or may be vulcanized by sulfur, peroxide, metal oxide or radiation cure systems as is well known in the art.

To produce a fabric article having sufficient ballistic resistance properties, the proportion of fibers forming the fabric preferably comprises from about 50% to about 98% by weight of the fibers plus the polymeric binder material, more preferably from about 70% to about 95%, and most preferably from about 78% to about 90% by weight of the fibers plus the polymeric binder material. Thus, the polymeric binder material preferably comprises from about 2% to about 50% by weight of the fabric, more preferably from about 5% to about 30% and most preferably from about 10% to about 22% by weight of the fabric, wherein 16% is most preferred.

The application of the polymeric binder material is conducted prior to consolidating non-woven fiber plies, and the binder coating is to be applied on top of any pre-existing fiber finish, such as a spin finish or may be applied after partial or complete removal of any pre-existing fiber finish. The fibers of the invention may be coated on, impregnated with, embedded in, or otherwise applied with a polymeric binder material by applying the composition to the fibers, followed by consolidating the coated fibers to form a composite. The binder material may first be applied onto a plurality of fibers followed by forming at least one fiber ply from said fibers, where the individual fibers are coated either sequentially or concurrently. Alternately, at least one fiber ply may be formed first followed by applying the polymeric binder material onto said at least one fiber ply.

For the purposes of the present invention, the term "coated" is not intended to limit the method by which the polymeric binder material is applied onto the fiber surfaces and any appropriate method of applying the polymeric composition onto the fiber surfaces may be utilized. For example, the polymeric binder material may be applied in solution form by spraying or roll coating a solution of the composition onto fiber surfaces, wherein a portion of the solution comprises the desired polymer or polymers and a portion of the solution comprises a solvent capable of dissolving or dispersing the polymer or polymers, followed by drying. Another method is to apply a neat polymer of the coating material to fibers either as a liquid, a sticky solid or particles in suspension or as a fluidized bed. Alternatively, the coating may be applied as a solution, emulsion or dispersion in a suitable solvent which does not adversely affect the properties of the fiber at the temperature of application. For example, the fiber can be transported through a solution of the polymeric binder material to substantially coat the fiber and then dried to form a coated fiber. The resulting coated fiber is then arranged into the desired configuration. In another coating technique, fiber plies or woven fabrics may first be arranged, followed by dipping the plies or fabrics into a bath of a solution containing the polymeric binder material dissolved in a suitable solvent, such that each individual fiber is at least partially coated with the polymeric binder material, and then dried through evaporation or volatilization of the solvent. The dipping procedure may be repeated several times as required to place a desired amount of polymeric binder material coating onto the fibers, preferably encapsulating each of the individual fibers or covering all or substantially all of the fiber surface area with the polymeric binder material.

While any liquid capable of dissolving or dispersing a polymer may be used, preferred groups of solvents include water, paraffin oils and aromatic solvents or hydrocarbon solvents, with illustrative specific solvents including paraffin oil, xylene, toluene, octane, cyclohexane, methyl ethyl ketone (MEK) and acetone. The techniques used to dissolve or disperse the coating polymers in the solvents will be those conventionally used for the coating of similar materials on a variety of substrates.

Other techniques for applying the coating to the fibers may be used, including coating of the high modulus precursor (gel fiber) before the fibers are subjected to a high temperature stretching operation, either before or after removal of the solvent from the fiber (if using a gel-spinning fiber forming technique). The fiber may then be stretched at elevated temperatures to produce the coated fibers. The gel fiber may be passed through a solution of the appropriate coating polymer under conditions to attain the desired coating. Crystallization of the high molecular weight polymer in the gel fiber may or may not have taken place before the fiber passes into the solution. Alternatively, the fibers may be extruded into a fluidized bed of an appropriate polymeric powder. Furthermore, if a stretching operation or other manipulative process, e.g. solvent exchanging, drying or the like is conducted, the coating may be applied to a precursor material of the final fibers. In the most preferred embodiment of the invention, the fibers of the invention are first coated with the polymeric binder material, followed by arranging a plurality of fibers into either a woven or non-woven fabric. Such techniques are well known in the art.

As is well known in the art, consolidation is done by positioning the individual fiber plies on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder material can be caused to stick or flow without completely melting. However, generally, if the polymeric binder material is caused to melt, relatively little pressure is required to form the composite, while if the polymeric binder material is only heated to a sticking point, more pressure is typically required. Consolidation may also be achieved by a wet lamination of the first fibrous web to the second fibrous web without requiring heat and/or pressure. As is conventionally known in the art, consolidation may be conducted in a calender set, a flat-bed laminator, a press or in an autoclave.

Alternately, consolidation may be achieved by molding under heat and pressure in a suitable molding apparatus. Generally, molding is conducted at a pressure of from about 50 psi (344.7 kPa) to about 5000 psi (34470 kPa), more preferably about 100 psi (689.5 kPa) to about 1500 psi (10340 kPa), most preferably from about 150 psi (1034 kPa) to about 1000 psi (6895 kPa). Molding may alternately be conducted at higher pressures of from about 500 psi (3447 kPa) to about 5000 psi, more preferably from about 750 psi (5171 kPa) to about 5000 psi and more preferably from about 1000 psi to about 5000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. (~149° C.) and most preferably at a temperature from about 200° F. to about 280° F. (~121° C.). The pressure under which the fabrics of the invention are molded has a direct effect on the stiffness or flexibility of the resulting molded product. Particularly, the higher the pressure at which the fabrics are molded, the higher the stiffness, and vice-versa. In addition to the molding pressure, the quantity, thickness and composition of the fabric plies and polymeric binder material type also directly affects the stiffness of the articles formed from the inventive fabrics.

While each of the molding and consolidation techniques described herein are similar, each process is different. Particularly, molding is a batch process and consolidation is a continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft body armor fabrics. Molding is typically reserved for the manufacture of hard armor, e.g. rigid plates. In the context of the present invention, consolidation techniques and the formation of soft body armor are preferred.

In either process, suitable temperatures, pressures and times are generally dependent on the type of polymeric binder coating materials, polymeric binder content (of the combined coatings), process used and fiber type. The fabrics formed herein may optionally be calendered under heat and pressure to smooth or polish their surfaces. Calendering methods are well known in the art.

The thickness of the individual fabrics will correspond to the thickness of the individual fibers. A preferred woven fabric will have a preferred thickness of from about 25 µm to about 500 µm per layer, more preferably from about 50 µm to about 385 µm and most preferably from about 75 µm to about 255 µm per layer. A preferred non-woven fabric, i.e. a non-woven, single-layer, consolidated network, will have a preferred thickness of from about 12 µm to about 500 µm, more preferably from about 50 µm to about 385 µm and most preferably from about 75 µm to about 255 µm, wherein a single-layer, consolidated network typically includes two consolidated plies (i.e. two unitapes), with the exception of the COMPARATIVE A composite utilized in the comparative examples, where a single layer of the composite includes four plies. While such thicknesses are preferred, it is to be understood that other thicknesses may be produced to satisfy a particular need and yet fall within the scope of the present invention.

The fabrics of the invention will have a preferred areal density of from about 50 grams/m² (gsm) (0.01 lb/ft² (psf)) to about 1000 gsm (0.2 psf). More preferable areal densities for the fabrics of this invention will range from about 70 gsm (0.014 psf) to about 500 gsm (0.1 psf). The most preferred areal density for fabrics of this invention will range from about 100 gsm (0.02 psf) to about 250 gsm (0.05 psf). The articles of the invention, which consist of multiple individual layers of fabric stacked one upon the other, will further have a preferred areal density of from about 1000 gsm (0.2 psf) to about 40,000 gsm (8.0 psf), more preferably from about 2000 gsm (0.40 psf) to about 30,000 gsm (6.0 psf), more preferably from about 3000 gsm (0.60 psf) to about 20,000 gsm (4.0 psf), and most preferably from about 3750 gsm (0.75 psf) to about 10,000 gsm (2.0 psf).

The structures of the invention may be used in various applications to form a variety of different ballistic resistant articles using well known techniques. For example, suitable techniques for forming ballistic resistant articles are described in, for example, U.S. Pat. Nos. 4,623,574, 4,650, 710, 4,748,064, 5,552,208, 5,587,230, 6,642,159, 6,841,492 and 6,846,758. The structures are particularly useful for the formation of flexible, soft armor articles, including garments such as vests, pants, hats, or other articles of clothing, and covers or blankets, used by military personnel to defeat a number of ballistic threats, such as 9 mm full metal jacket (FMJ) bullets and a variety of fragments generated due to explosion of hand-grenades, artillery shells, Improvised Explosive Devices (IED) and other such devises encountered in a military and peace keeping missions.

As used herein, "soft" or "flexible" armor is armor that does not retain its shape when subjected to a significant amount of stress. The structures are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. The structures can be cut into a plurality of discrete sheets and stacked for formation into an article or they can be formed into a precursor which is subsequently used to form an article. Such techniques are well known in the art.

Garments of the invention may be formed through methods conventionally known in the art. Preferably, a garment may be formed by adjoining the ballistic resistant articles of the invention with an article of clothing. For example, a vest may comprise a generic fabric vest that is adjoined with the ballistic resistant structures of the invention, whereby the inventive structures are inserted into strategically placed pockets. This allows for the maximization of ballistic protection, while minimizing the weight of the vest. As used herein, the terms "adjoining" or "adjoined" are intended to include attaching, such as by sewing or adhering and the like, as well as un-attached coupling or juxtaposition with another fabric, such that the ballistic resistant articles may optionally be easily removable from the vest or other article of clothing. Articles used in forming flexible structures like flexible sheets, vests and other garments are preferably formed from using a low tensile modulus binder material. Hard articles like helmets and armor are preferably, but not exclusively, formed using a high tensile modulus binder material.

The ballistic resistance properties are determined using standard testing procedures that are well known in the art. Particularly, the protective power or penetration resistance of a structure is normally expressed by citing the impacting velocity at which 50% of the projectiles penetrate the composite while 50% are stopped by the shield, also known as the $V_{50}$ value. As used herein, the "penetration resistance" of an article is the resistance to penetration by a designated threat, such as physical objects including bullets, fragments, shrapnel and the like, and non-physical objects, such as a blast from explosion. For composites of equal areal density, which is the weight of the composite divided by its area, the higher the $V_{50}$, the better the ballistic resistance of the composite. The ballistic resistant properties of the articles of the invention will vary depending on many factors, particularly the type of fibers used to manufacture the fabrics, the percent by weight of the fibers in the composite, the suitability of the physical properties of the resin matrix, the number of layers of fabric making up the composite and the total areal density of the composite. However, the use of a polymeric binder material that is resistant to dissolution or penetration by sea water, and resistant to dissolution or penetration by one or more organic solvents, does not negatively affect the ballistic properties of the articles of the invention. The fabrics of the invention also have excellent durability as indicated by good peel strength and flexibility of the fabrics, as illustrated in the examples.

The following examples serve to illustrate the invention:

EXAMPLES

Various fabric samples were tested as exemplified below. Table 1 describes the fabric samples tested in the Examples and Comparative Examples. For Sample A, the binder is an unmodified, water-based polyurethane polymer. For Sample B, the binder is a rosin ester-modified dispersion of a styrene-isoprene-styrene (SIS) block copolymer sold under the trademark PRINLIN® and commercially available from Henkel Technologies, based in Düsseldorf, Germany. For Sample C, the binder is a fluorocarbon-modified, water-based acrylic polymer (84.5 wt. % acrylic copolymer sold as HYCAR® 26-1199, commercially available from Noveon, Inc. of Cleveland, Ohio; 15 wt. % NUVA® NT X490 fluorocarbon resin, commercially available from Clariant International, Ltd. of Switzerland; and 0.5% Dow TERGITOL® TMN-3 non-ionic surfactant commercially available from Dow Chemical Company of Midland, Mich.). For Sample D, the binder is a fluorocarbon-modified polyurethane polymer (84.5 wt. % polyurethane polymer sold as SANCURE® 20025, from Noveon, Inc.; 15 wt. % NUVA® NT X490 fluorocarbon resin; and 0.5% Dow TERGITOL® TMN-3 non-ionic surfactant). For Sample E, the binder is a fluoropolymer/nitrile rubber blend of the invention (84.5 wt. % nitrile rubber polymer sold as TYLAC®68073 from Dow Reichhold of North Carolina; 15 wt. % NUVA® TTHU fluorocarbon resin; and 0.5% Dow TERGITOL® TMN-3 non-ionic surfactant). Fabric samples F and G are woven fabrics with no binder.

Fabric samples A and C-E were non-woven, aramid-based fabrics with a two-ply (two unitape), 0°/90 construction. The fabrics are manufactured from 1000-denier TWARON® type 2000 aramid fibers having a fiber areal density (FAD) of 45 gsm, and had a fiber content of 85%. Fabric sample B was similar but had a four-ply 0°/90/0°/90 construction and a layer of 0.25-mil thick LDPE film laminated to both outside plies. Each ply has a fiber content of 85%, but the final construction, including the LDPE film, has a fiber content of approximately 80%. The Fiber Areal Density (FAD) of each ply (unitape) was 45 gsm. The non-woven fabrics were consolidated into integrated fabrics. Fabric sample F was a woven, aramid based fabric manufactured from 500-denier, TWARON® Type 2000 aramid fibers with a pick count of 28×28 and a fiber content of 100%. Fabric sample G was a woven, aramid based fabric manufactured from 600-denier, KEVLAR® KM2 aramid fibers with a pick count of 29×29 and a fiber content of 100%. The fabric samples are summarized in Table 1.

TABLE 1

| SAMPLE | CONSTRUCTION | Fiber Type | Resin | % Fiber |
|---|---|---|---|---|
| A | 2-ply, 0°/90° Non-Woven | 1000-denier Aramid | Polyurethane | 85% |
| B | 4-ply, 0°/90°/0°/90° Non-Woven with LDPE film over-laminate | 1000-denier Aramid | Rosin ester-modified S-I-S Rubber | 78% |
| C | 2-ply, 0°/90° Non-Woven | 1000-denier Aramid | Modified Acrylic | 85% |
| D | 2-ply, 0°/90° Non-Woven | 1000-denier Aramid | Modified Polyurethane | 85% |
| E | 2-ply, 0°/90° Non-Woven | 1000-denier Aramid | Modified Nitrile Rubber | 85% |
| F | 28 × 28 Woven | 500-denier TWARON ® Type 2000 Aramid | None | 100% |
| G | 29 × 29 Woven | 600-denier KEVLAR ® KM2 Aramid | None | 100% |

Articles of ballistic resistant armor can be designed and constructed so as to achieve a desired $V_{50}$ by adding or subtracting individual layers of ballistic resistant fabric. For the purpose of these experiments, the construction of the articles was standardized by stacking a sufficient number of fabric layers such that the Total Areal Density (TAD) (areal density of fabrics including the fibers and the polymeric binder material) of the article was 1.00±0.02 psf. Depending on the TAD of the individual fabric layers, the count of layers required to maintain the article's targeted TAD between 0.98 psf and 1.02 psf ranged between 44 and 47 for Samples A, C, D and E. For Sample B, a total of 21 layers are needed to give a resulting TAD of 1.00 PSF. For Sample F, the woven aramid Style #275580, a total of 39 layers are needed to give a resulting TAD of 1.00 PSF. For Sample G, the woven aramid Style #751, a total of 32 layers are needed to give a resulting TAD of 1.00 PSF. Each of these stacks of fabric was then placed into a nylon fabric rip-stop carrier, which was then stitched closed. At this point, the assembly was considered to be the ballistic article sample upon which testing would be done.

Including the polymeric binder material, the TAD of each single unitape ply of the non-woven fabrics ranged from 52.5 gsm to 54.0 gsm. The TAD of each fabric layer for Samples A, C, D and E (equal to twice the TAD of each single-ply for a two-ply fabric) ranged from 105 gsm to 108 gsm. For Sample B, the TAD for a fabric layer would range from 218 gsm to 228 gsm. Each layer of fabric was a nominal 15"×15" square. These fabric layers were then assembled into an article, as described above.

The $V_{50}$ ballistic resistance of several different fabric test packs was evaluated after submersion in salt water and after submersion in gasoline, respectively. Inventive Examples 5 and 12 show the performance of inventive fabric Sample E following the salt water and gasoline submersion. Comparative Examples 1-4, 6-11 and 13-14 show the performance of comparative fabric Samples A-D and F-G following the salt water and gasoline submersion. Results for said testing are shown in Tables 2 and 3. Additional testing was also conducted without gasoline or water submersion, and the results are provided in Tables 4-7. Table 4 outlines the ballistic testing results of said fabrics against 17 grain FSP fragments (fragment confirming: MIL-P-46593A) following the standardized testing conditions of MIL-STD-662F. Table 5 outlines the ballistic testing results of said fabrics against a 9 mm, 124 grain, FMJ (full metal jacket) bullet, following the standardized testing conditions of MIL-STD-662F. Table 6 illustrates the flexibility of each sample according to the circular bend test method of ASTM D4032. Table 7 illustrates the peel strength/interlayer bond strength of each non-woven sample (Samples A-E) according to the test method of ASTM D1876-01.

The procedures for the ballistic evaluation after environmental exposure to salt water and gasoline, and for the preparation of the test samples are outlined as follows:

A. Procedure for the Ballistic Evaluation of a Polymeric Binder Material after Environmental Exposure Hardware:
1. Salt water immersion tray—plastic, flat-bottom open-top containers, 18" wide by 24" long by 6" deep.
2. Drying frame and clips.
3. Gasoline immersion chamber—stainless steel enclosure, approximately 24-inches wide by 24-inches deep by 36-inches high. The enclosure includes a front access door, a top access lid and several mounting bars bridging the left and right walls, one-inch from the top of the walls.
4. Gasoline immersion transport carrier.
5. Weighing scale.
6. Indelible marker pen.
7. Timer.
8. Ballistic mounting frame.
9. Ballistics range capable of firing and determining the velocity of 16-grain RCC fragments.

Materials:
1. 15-inch by 15-inch squares of the non-woven fabrics to be evaluated.
2. 16-inch by 16-inch nylon "rip-stop" carriers.
3. De-ionized water.
4. Sea Salt (or mixture of Sodium Chloride and Magnesium Chloride).
5. 5 Gallons of U.S. regular-grade (87-octane, unleaded) gasoline.
6. 16-grain RCC fragments.

B. Procedure for Preparing the Test Packs
1. Ten 15-inch by 15-inch square samples of each fabric were weighed to determine a Total Areal Density (TAD) of a fabric sample.
2. The number of these samples required to equal a sample TAD of 1.00 lb/ft$^2$ (PSF)+/−0.02 PSF was determined. This number was defined as the "Layer Count".
3. Twelve stacks of the 15-inch by 15-inch squares were prepared for each fabric. The number of 2-ply layers of fabric (or 4-ply for Sample B fabric) in each stack was the same as the "Layer Count", and a consistent orientation of the fibers in each sample was maintained (i.e. the fibers of the top ply in each sample were all pointed in the same direction).
4. When all twelve stacks had the required "Layer Count", each stack was weighed to determine whether an adjustment in the "Layer Count" was needed to achieve a nominal 1.00 PSF test pack (shoot pack). Any discrepancy in the number of layers between stacks was adjusted to have twelve equivalent stacks of 1.00 PSF. fabric samples.
5. Once twelve equivalent stacks of 1.00 lb. fabric layers were formed, each was inserted into a 16-inch by 16-inch nylon "rip-stop" carrier. The open end of the carrier was sewn to contain the test pack. Each carrier/test pack was corner stitched.
6. Using an indelible marker, all of the particulars of each test pack were recorded, including a unique identifier for each test pack on to the surface of the carrier. The test packs were re-weighed including the nylon carrier.
7. The twelve test packs were separated into four groups of three test packs: one group was used as the dry control for salt water immersion testing; another group was used for salt water immersion testing; another group was used as the dry control for gasoline immersion testing; and the final group was used for gasoline immersion testing.

C. 24-Hour Salt Water Immersion
1. Two full 500-gram containers of Morton Sea Salt were poured into an empty and clean salt water immersion tray. This salt was covered with 7 gallons of clear-running tap water. The tray was filled to approximately 3-inches of its 6-inch depth and stirred with a spatula until all of the salt dissolved. Instead of Morton Sea Salt a solution of 3.0% Sodium Chloride and 0.5% Magnesium Chloride in tap water may be used.
2. One of the samples from the group designated for salt water immersion testing was selected and its dry weight was verified to match the weight that was previously recorded.
3. The first of the salt water immersion test samples was completely submerged into the salt water solution. At one hour intervals, one more test pack was submerged into the salt water solution.
4. Once the first test pack was submerged in the salt water solution for 24 hours, the sample was ready for ballistic testing.

D. Ballistic Testing for Salt Water Immersion
1. The test pack was removed from the salt water solution, hung by one corner from the drying frame and allowed to drip-dry for 15 minutes.
2. The drip-dried sample was transported to the ballistics range and weighed to record its wet weight.
3. The sample was inserted into the ballistic mounting frame and this assembly was placed into the firing range.
4. A series of 16-grain RCC fragments were shot into the sample according to the MIL-STD-662E testing method. The velocity of the projectiles was adjusted to achieve a mixture of complete penetrations of the sample and partial penetrations of the sample. The velocity of each shot was measured and a $V_{50}$ for the sample was determined using accepted statistical analysis tools.
5. Thereafter, one of the samples from the dry control group was tested according to steps 3 and 4 for comparison.
6. The above steps were continued for all the designated salt water immersion testing samples and dry control samples and a $V_{50}$ was determined for each.

E. 4-Hour Gasoline Immersion
1. Five gallons of U.S. regular grade (87-octane, unleaded) gasoline were poured into the gasoline immersion chamber.
2. One of the samples from the group designated for gasoline immersion testing was selected and its dry weight was verified to match the weight that was previously recorded.
3. The first of the gasoline immersion test samples was completely submerged into the gasoline. At one hour intervals, one more test pack was submerged into the gasoline.
4. Once the first test pack was submerged in the Gasoline Immersion Chamber for 4 hours, the first sample was ready for ballistic testing.

F. Ballistic Testing for Gasoline Immersion
1. After 4 hours, the first sample was lifted out of the gasoline and clipped to one of the mounting bars across the top of the chamber. The sample was allowed to drip-dry for 15 minutes.
2. After the 15 minute drip-dry, the sample was removed from the mounting bar and placed into the gasoline immersion transport carrier and the lid closed.

3. The carrier was then transported to the ballistics laboratory, and the sample was weighed to record its wet weight.
4. The sample was inserted into the ballistic mounting frame and this assembly was placed into the firing range.
5. A series of 16-grain RCC fragments were shot into the sample according to the MIL-STD-662E testing method. The velocity of the projectiles was adjusted to achieve a mixture of complete penetrations of the sample and partial penetrations of the sample. The velocity of each shot was measured and a $V_{50}$ for the sample was determined using accepted statistical analysis tools.
6. Thereafter, one of the samples from the dry control group was tested according to steps 3 and 4 for comparison.
7. The above steps were continued for all the designated gasoline immersion testing samples and dry control samples and a $V_{50}$ was determined for each.

G. Results

TABLE 2

16 GRAIN RCC SALT WATER IMMERSION TESTING

| Ex. | Sample | Test | #1 | #2 | #3 | Average | $V_{50}$ Retention |
|---|---|---|---|---|---|---|---|
| 1 | A | Dry | 2091 | 2085 | 2137 | 2104 | |
|   |   | Wet | 1881 | 1851 | 1863 | 1865 | 89% |
| 2 | B | Dry | 2085 | 2095 | 2091 | 2090 | |
|   |   | Wet | 1625 | 1639 | 1683 | 1649 | 79% |
| 3 | C | Dry | 2012 | 2083 | 2092 | 2062 | |
|   |   | Wet | 2010 | 2043 | 2034 | 2029 | 98% |
| 4 | D | Dry | 2079 | 2045 | 2164 | 2096 | |
|   |   | Wet | 2089 | 2024 | 2146 | 2086 | 100% |
| 5 | E | Dry | 2171 | 2110 | 2089 | 2123 | |
|   |   | Wet | 2091 | 2102 | 2090 | 2094 | 99% |
| 6 | F | Dry | NR | NR | NR | NR | |
|   |   | Wet | NR | NR | NR | NR | Good* |
| 7 | G | Dry | 1989 | 2034 | 2027 | 2017 | |
|   |   | Wet | 2042 | 2047 | 2079 | 2056 | 102% |

*Estimate.

This table shows the excellent performance of Sample E versus the 16 grain RCC fragment, both dry and after a 24 hour salt water immersion.

TABLE 3

16 grain RCC Gasoline Immersion Testing

| Ex. | Product | Test | #1 | #2 | #3 | Average | $V_{50}$ Retention |
|---|---|---|---|---|---|---|---|
| 8 | A | Dry | Historical Average | | | 2009 | |
|   |   | Wet | Limited Testing | | | Low | <90% |
| 9 | B | Dry | Historical Average | | | 2032 | |
|   |   | Wet | Limited Testing | | | Low | <75% |
| 10 | C | Dry | 2133 | 2082 | 2031 | 2082 | |
|    |   | Wet | 2019 | 2061 | 2087 | 2056 | 99% |
| 11 | D | Dry | 1988 | 2155 | 2080 | 2074 | |
|    |   | Wet | 2025 | 1964 | 1875 | 1955 | 94% |
| 12 | E | Dry | 2171 | 2110 | 2089 | 2123 | |
|    |   | Wet | 2043 | 2002 | 1990 | 2012 | 95% |
| 13 | F | Dry | — | — | — | — | |
|    |   | Wet | — | — | — | — | **98% |
| 14 | G | Dry | 1989 | 2034 | 2027 | 2017 | |
|    |   | Wet | — | — | — | — | **98% |

**Estimates.

This table shows the excellent performance of Sample E versus the 16 grain RCC fragment, both dry and after a 4 hour gasoline immersion.

TABLE 4

17 grain FSP Fragment Testing

| | All Samples at 1.00 PSF | | $V_{50}$ (ft/sec) | | | |
|---|---|---|---|---|---|---|
| Product | #1 | #2 | #3 | #4 | #5 | Average |
| A | 1899 | 1905 | 1824 | 1901 | 1859 | 1878 |
| B | 1802 | 1874 | 1840 | 1887 | — | 1851 |
| C | 1859 | 1912 | 1911 | 1952 | 1922 | 1911 |
| D | 1948 | 1927 | 1920 | 1953 | 1922 | 1934 |
| E | 1971 | 1989 | 2001 | 1974 | 1983 | 1984 |
| F | 2013 | 1996 | 2038 | 1975 | 1967 | 1998 |
| G | 1900 | 1847 | 1933 | 1912 | 1923 | 1903 |

This table shows the excellent Fragment performance of Sample E relative to similar products and to woven aramid fabrics

TABLE 5

9 mm Testing

| All Samples at 1.00 PSF | | $V_{50}$ (ft/sec) | | | |
|---|---|---|---|---|---|
| Product | #1 | #2 | #3 | #4 | Average |
| A | 1688 | 1716 | 1741 | — | 1715 |
| B | 1755 | 1729 | 1685 | — | 1723 |
| C | 1669 | 1689 | 1690 | 1671 | 1680 |
| D | 1710 | 1681 | 1699 | 1740 | 1708 |
| E | 1704 | 1691 | 1724 | 1722 | 1710 |
| F | 1548 | 1639 | 1518 | 1528 | 1558 |
| G | 1575 | 1530 | 1579 | 1525 | 1552 |

This table shows the excellent bullet performance of Sample E relative to similar products and woven aramid fabrics.

TABLE 6

Circular Bend Flexibility Single Layers Test

| Product | #1 | #2 | #3 | Avg. force(Newtons) |
|---|---|---|---|---|
| A | 8.4 | 8.7 | 9.2 | 8.8 |
| B | 8.2 | 8.6 | 9.4 | 8.7 |
| C | 7.0 | 7.4 | 6.8 | 7.1 |
| D | 7.9 | 8.1 | 8.1 | 8.0 |
| E | 6.7 | 6.4 | 6.6 | 6.6 |
| F | 3.7 | 3.3 | 3.4 | 3.5 |
| G | 8.7 | 10.1 | 9.0 | 9.3 |

This table shows the high flexibility of Sample E when compared to similar non-woven products. Testing conducted according to the ASTM D4032 Circular Bend testing method.

TABLE 7

1" Peel Strength Test

| | | | | Data in PLI of Width | | |
|---|---|---|---|---|---|---|
| | Samples at 1.00 PSF | | | Product Averages | | |
| | #1 | #2 | #3 | | | |
| Product | Avg Load | Avg Load | Avg Load | Load | Peaks | Spikes |
| A | 0.557 | 0.528 | 0.501 | 0.529 | 0.6441 | 122% |
| B | Historical Average of 2-3 Bond | | | 0.267 | — | — |
| C | 1.297 | 0.803 | 0.557 | 0.886 | 1.0021 | 113% |

TABLE 7-continued

1" Peel Strength Test

| | Samples at 1.00 PSF | | | Data in PLI of Width Product Averages | | |
|---|---|---|---|---|---|---|
| | #1 | #2 | #3 | | | |
| Product | Avg Load | Avg Load | Avg Load | Load | Peaks | Spikes |
| D | 1.032 | 1.067 | 1.558 | 1.219 | 1.3853 | 114% |
| E | 2.031 | 1.863 | 2.13 | 2.008 | 2.132 | 106% |
| F | N/A | N/A | N/A | N/A | N/A | N/A |
| G | N/A | N/A | N/A | N/A | N/A | N/A |

This table shows the high level and the consistency of interlayer bond strength of the Sample E. This test does not apply to woven aramid fabrics.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A ballistic resistant fabric comprising a plurality of fibers, said fibers being united and forming a fabric, said fibers having a tenacity of about 7 g/denier or more and a tensile modulus of about 150 g/denier or more; and said fibers having a polymeric binder material thereon which comprises a non-crosslinked nitrile rubber polymer, said binder being resistant to dissolution, penetration and/or transpiration by water and resistant to dissolution, penetration and/or transpiration by one or more organic solvents.

2. The ballistic resistant fabric of claim 1, wherein said fibers are non-woven.

3. The ballistic resistant fabric of claim 2 wherein said fabric comprises a plurality of non-woven fiber plies, wherein each fiber ply comprises a plurality of unidirectional fibers arranged in a substantially parallel array, and wherein each of said fiber plies are cross-plied at an angle relative to the fiber direction of each adjacent fiber ply.

4. The ballistic resistant fabric of claim 1, wherein said non-crosslinked nitrile rubber polymer has an acrylonitrile content of from about 15 wt % to about 50 wt %.

5. The ballistic resistant fabric of claim 4 wherein said non-crosslinked nitrile rubber polymer has an acrylonitrile content of from about 15 wt. % to about 30 wt. %.

6. The ballistic resistant fabric of claim 1, wherein said polymeric binder material comprises from about 2% to about 50% by weight of said fabric.

7. The ballistic resistant fabric of claim 1, wherein said polymeric binder material comprises a blend of said non-crosslinked nitrile rubber polymer and a fluorine-containing material.

8. The ballistic resistant fabric of claim 7 wherein said fluorine-containing material comprises from about 5 wt. % to about 20 wt. % of said polymeric binder material.

9. The ballistic resistant fabric of claim 1 wherein said non-crosslinked nitrile rubber polymer comprises a nitrile rubber terpolymer.

10. The ballistic resistant fabric of claim 9 wherein said terpolymer is formed from an acrylonitrile monomer, a butadiene rubber monomer, and N-methylol acrylamide.

11. The ballistic resistant fabric of claim 1 wherein said non-crosslinked nitrile rubber polymer comprises a carboxylated nitrile rubber terpolymer.

12. The ballistic resistant fabric of claim 1 wherein said non-crosslinked nitrile rubber polymer comprises a hydrogenated nitrile rubber.

13. The ballistic resistant fabric of claim 1 wherein said polymeric binder material further comprises at least one surfactant.

14. A ballistic resistant article formed from said ballistic resistant fabric of claim 1.

15. A method of producing a ballistic resistant fabric, the method comprising either step I) or step II), wherein:
I) applying a polymeric binder material onto a plurality of fibers and thereafter forming a non-woven fabric from said fibers; said fibers having a tenacity of about 7 g/denier or more and a tensile modulus of about 150 g/denier or more;
wherein said polymeric binder material comprises a non-crosslinked nitrile rubber polymer, said binder being resistant to dissolution, penetration and/or transpiration by water and resistant to dissolution, penetration and/or transpiration by one or more organic solvents, wherein said non-crosslinked nitrile rubber polymer has an acrylonitrile content of from about 15 wt % to about 50 wt % and said polymeric binder material comprises from about 2% to about 50% by weight of said fabric; or
II) organizing a plurality of fibers into at least one fiber layer, thereafter combining said at least one fiber layer with a polymeric binder material to form a non-woven fabric; said fibers having a tenacity of about 7 g/denier or more and a tensile modulus of about 150 g/denier or more; wherein said polymeric binder material comprises a non-crosslinked nitrile rubber polymer, said binder being resistant to dissolution, penetration and/or transpiration by water and resistant to dissolution, penetration and/or transpiration by one or more organic solvents, wherein said non-crosslinked nitrile rubber polymer has an acrylonitrile content of from about 15 wt % to about 50 wt % and said polymeric binder material comprises from about 2% to about 50% by weight of said fabric.

16. The method of claim 15 wherein step I) is conducted.

17. The method of claim 15 wherein step II) is conducted.

18. A ballistic resistant fabric comprising a plurality of fibers, said fibers being united and forming a fabric, said fibers having a tenacity of about 7 g/denier or more and a tensile modulus of about 150 g/denier or more; and said fibers having a polymeric binder material thereon which comprises a nitrile rubber polymer and at least one surfactant, said binder being resistant to dissolution, penetration and/or transpiration by water and resistant to dissolution, penetration and/or transpiration by one or more organic solvents.

19. The ballistic resistant fabric of claim 18, wherein said fibers are non-woven.

20. The ballistic resistant fabric of claim 19, wherein said fibers comprise polyethylene.

* * * * *